Feb. 26, 1963 R. C. GROVES 3,079,485
METHOD AND APPARATUS FOR MAKING HOT BEVERAGES
Filed Oct. 15, 1959 3 Sheets-Sheet 1
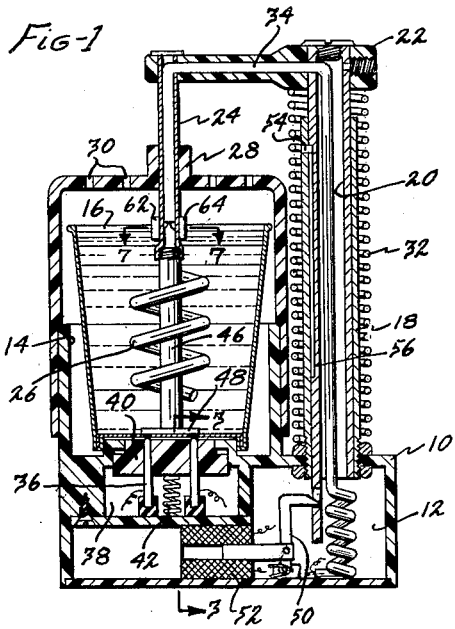
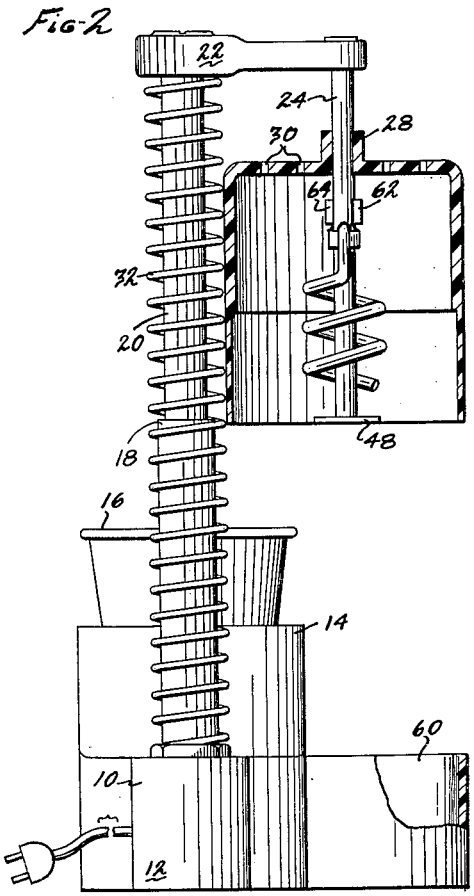
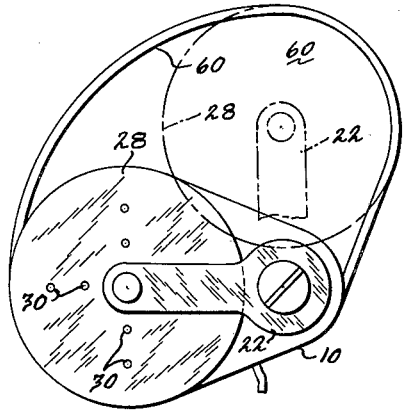
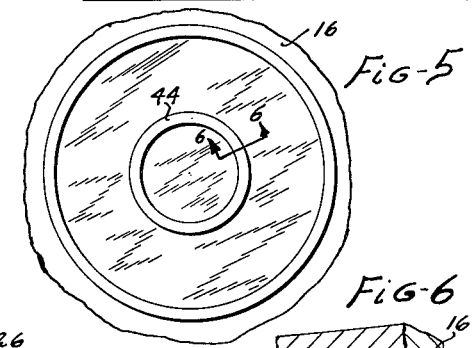
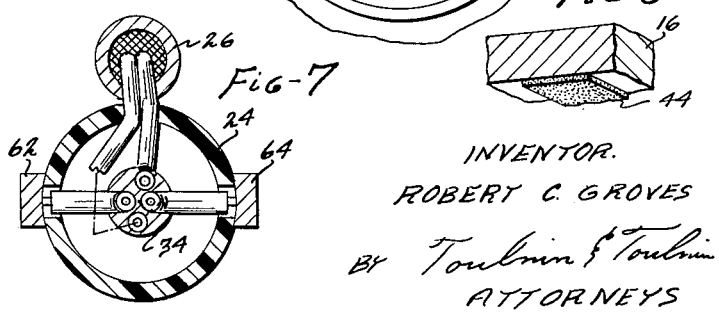
INVENTOR.
ROBERT C. GROVES
BY Toulmin & Toulmin
ATTORNEYS Feb. 26, 1963
R. C. GROVES
3,079,485
METHOD AND APPARATUS FOR MAKING HOT BEVERAGES
Filed Oct. 15, 1959
3 Sheets-Sheet 2
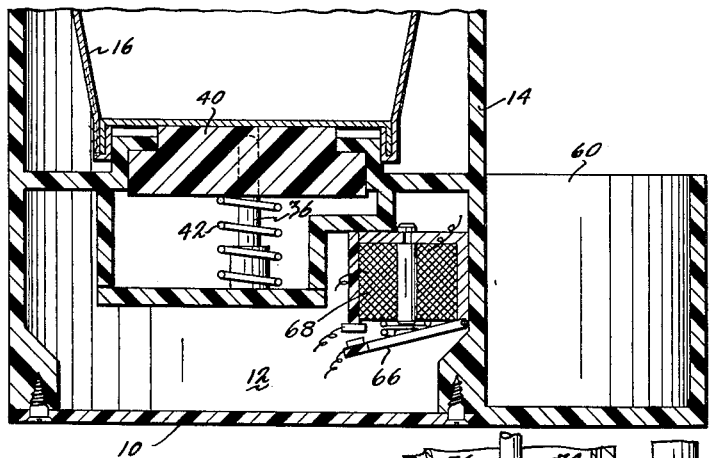
FIG-3
FIG-8
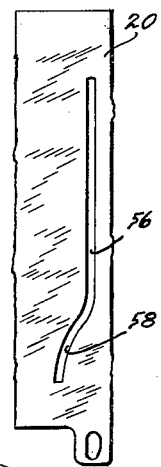
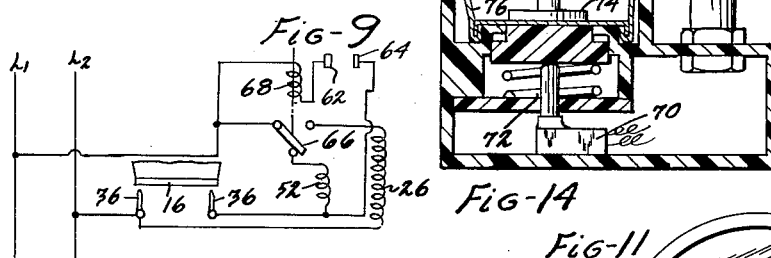
FIG-9
FIG-14
FIG-11
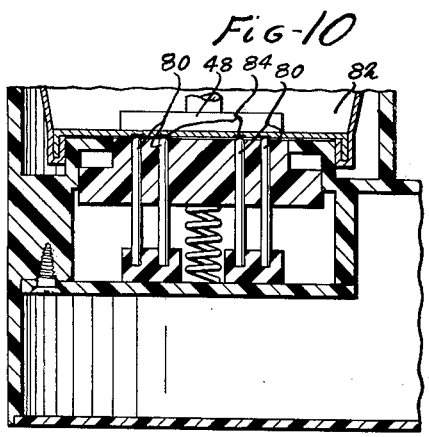
FIG-10
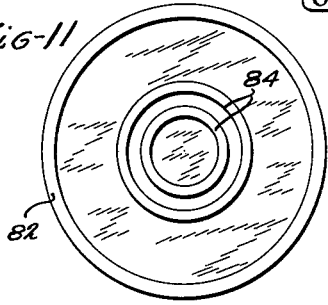
FIG-12
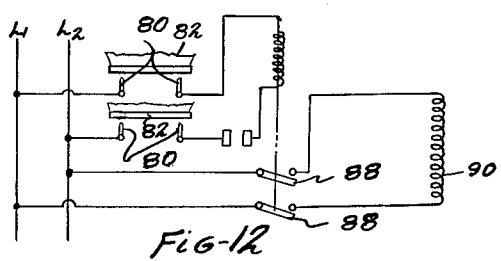
FIG-13
INVENTOR.
ROBERT C. GROVES
BY Toulmin & Toulmin
ATTORNEYS

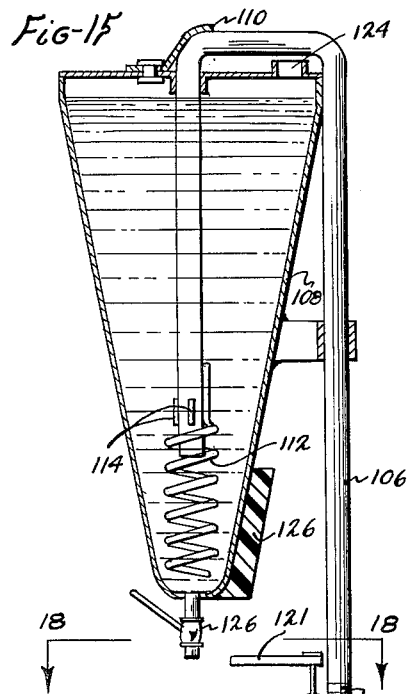
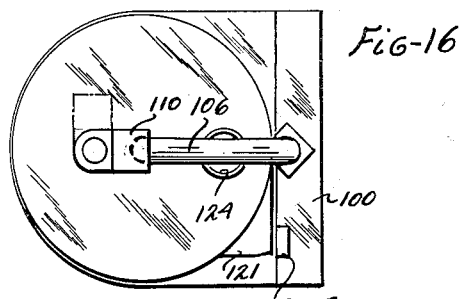
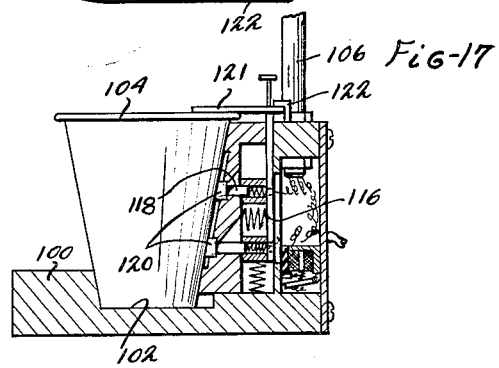
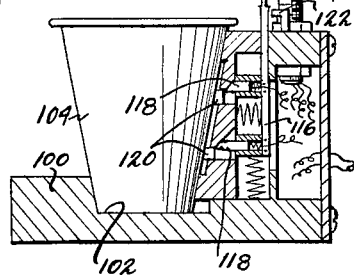
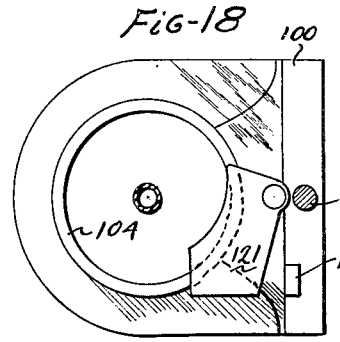
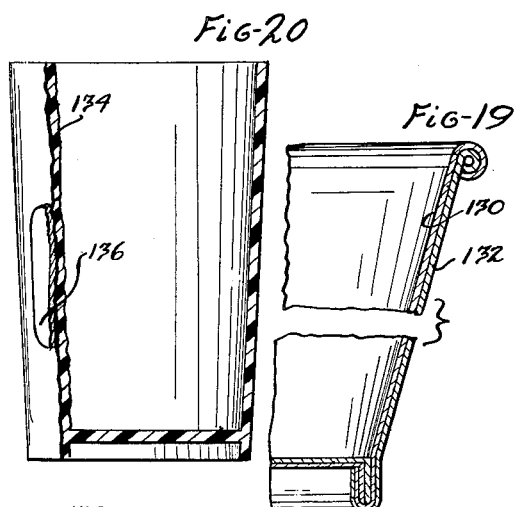
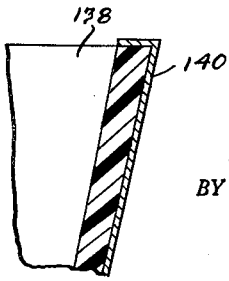

United States Patent Office 3,079,485
Patented Feb. 26, 1963

3,079,485
METHOD AND APPARATUS FOR MAKING
HOT BEVERAGES
Robert C. Groves, 1800 Southwood Lane W.,
Dayton Ohio
Filed Oct. 15, 1959, Ser. No. 846,701
17 Claims. (Cl. 219—41)

This invention relates to a method and apparatus for heating water and is particularly concerned with such a method and apparatus for heating small quantities of water such as might be employed for making coffee or tea or like beverages.

It many times is desirable to heat small quantities of water for the purpose of making a small quantity of a beverage such as coffee or tea. For example, many individuals immediately upon arising desire a hot beverage, particularly coffee, and while it is relatively convenient in the home to heat a small quantity of water and make a cup of coffee, this becomes a considerable inconvenience for a traveler.

With this in mind, it is an object of this invention to provide an extremely convenient arrangement for heating small quantities of water.

A further object of this invention is the provision of a simple apparatus that can be placed in hotel or motel rooms and in which there can safely and conveniently be heated a small quantity of water.

A still further object of this invention is the provision of a method and apparatus for heating small quantities of water in which the device is automatic and will turn itself off before the water being heated reaches a level at which the heating element would be exposed if the apparatus was turned on and forgotten.

A still further object of this invention is an apparatus for heating small quantities of water in which the heating element is entirely submerged when it is energized and is prevented from being energized when it is not submerged.

It is also an object of this invention to provide a structure for heating water in which there is an electric heating element which is enclosed at all times whether the structure is operating or not operating so that there is little likelihood of any one being injured by the electric heater.

Another object of this invention is the provision of an apparatus for heating small quantities of water which requires a special cup for making the device operative thereby reducing the possibility of the use of the apparatus by unauthorized persons.

A still further object of this invention is the provision of an apparatus of the nature referred to which is readily portable so that it could be carried about for individual use as well as being adapted for being installed in travelers' rooms such as a hotel or motel room.

Still another object of this invention is the provision of an arrangement for converting a standard drinking cup such as a paper cup for use with an apparatus of this invention to make the apparatus operative for heating water directly within the cup.

These and other objects and advantages will become more apparent upon reference to the drawings in which:

FIGURE 1 is a vertical sectional view through a device according to my invention showing the device in its operative position;

FIGURE 2 is a rear elevational view of the device showing it in its open position and partly in section;

FIGURE 3 is a vertical sectional view indicated by line 3—3 on FIGURE 1 and drawn at enlarged scale showing more in detail the construction of the device;

FIGURE 4 is a plan view looking down on top of FIGURE 1;

FIGURE 5 is a bottom elevational view of a cup having a conducting ring on the bottom thereof in accordance with this invention;

FIGURE 6 is a fragmentary sectional perspective view indicated by line 6—6 on FIGURE 5 showing the conducting ring on the bottom of the cup;

FIGURE 7 is a sectional view indicated by line 7—7 on FIGURE 1 showing the mounting of a pair of detecting electrodes in the apparatus that detect the water level in the cup;

FIGURE 8 is a developed view showing the formation of a slot in the post that supports the cap of the device and which slot causes rotation of the cap from above the cup as the cap raises at the completion of a heating cycle;

FIGURE 9 is a diagrammatic representation of a typical control circuit that can be employed with this invention;

FIGURE 10 is a fragmentary sectional view through a modification in which two pairs of electrodes are employed for controlling the energization of the heating element;

FIGURE 11 is a bottom elevational view of a cup for use in the FIGURE 10 modification;

FIGURE 12 is a diagrammatic representation of the control circuit of the FIGURE 10 modification;

FIGURE 13 is a perspective view showing the manner in which a disc having conducting rings thereon could be provided for cementing to the bottom of a standard paper cup to make the device operative;

FIGURE 14 is a fragmentary sectional view similar to FIGURE 3 showing the manner in which a switch could be mounted in the base of the device for controlling the circuit rather than using conductive portions on the bottom of the cup.

FIGURE 15 is a more or less diagrammatic sectional view showing how my invention could be practiced where the water was heated in a container separate from the cup so that the quantity being heated would not be limited by the size of the cup;

FIGURE 16 is a plan view of the FIGURE 15 arrangement;

FIGURE 17 is a view of the lower portion of the structure of FIGURE 15 showing the cup in place and the member lowered which causes the device to become operative;

FIGURE 18 is a plan sectional view indicated by line 18—18 on FIGURE 15;

FIGURE 19 is a fragmentary sectional view showing the manner in which a cup could be made of a paper and metallic foil laminated so that the entire outer surface of the cup was conductive;

FIGURE 20 is a view partly in section showing a plastic container having conductive areas thereon; and FIGURE 21 is a fragmentary view of a plastic container having a metal coating thereon which might be applied, for example, by gas plating or vacuum deposition.

Referring to the drawings somewhat more in detail, the device illustrated in FIGURES 1 through 4 comprises a base member 10 formed with a hollow bottom part 12 and an upstanding cylindrical flange part 14 forming a recess for receiving a cup 16.

Base portion 10 also supports in fixed relation thereto an upstanding tubular column 18. Slidable within column 18 is a tube 20 that has attached to the upper end an arm 22 from the outer end of which depends a support member 24 also in the form of a tube. The lower end of support member 24 has attached thereto an electric resistance heating element 26 of the enclosed type. Also mounted on tubular support member 24 is a cap 28 adapted for being received about the outside of flange portion 14 of the base so that when the apparatus is in its FIGURE 1 position the cup and heating element are entirely enclosed. The cup 28 is preferably provided with vent holes 30 in the top thereof.

A compression spring 32 acts between the base and the arm 22 so as to urge the arm and cap and tube 20 upwardly relative to the base.

Electrical energy is supplied to heating element 26 by way of a cable 34 leading from the element through support member 24 and support arm 22 and down through tubular member 20 into the hollow portion 12 of the base.

The supply of electrical energy to cable 34 is under the control of a circuit that includes a pair of electrodes or contact prongs 36 which are arranged in vertical relation within a recess 38 formed in base 10 immediately beneath the bottom of the cup. These contact prongs or electrodes are preferably resiliently urged upwardly and they extend through a block of insulating material 40 also spring urged upwardly by a spring 42 so that when cup 16 is removed the upper ends of the electrodes are concealed and enclosed so they cannot accidentally be touched.

The cup 16 as will be seen in FIGURE 5 comprises a conductive ring 44 formed about the bottom thereof which the electrodes or contact prongs engage when the cup is set on block 40 and the block and cup are then pressed downwardly against the bias of spring 42. This serves to complete the energizing circuit through cable 34 and the heating element so that water within the cup will be heated by the electric heating element.

For pressing the cup downwardly against the bias of spring 42 there extends downwardly from the bottom of support tube 24 a member 46 terminating in a foot 48 and which foot will engage the bottom of the cup and press it downwardly when the support arm 22 and the parts attached thereto are moved downwardly against the bias of spring 32.

According to one modification tubular member 20 may be engaged by a latch element 50 mounted in the base which will hold the tubular member in its lower position until a solenoid 52 is energized which will serve to withdraw the latch and thus permit the spring 32 to move the support arm and its connected parts upwardly.

In order to provide for proper locating of the cap 28 when the device is lowered over a cup, and also to cause the cap to rotate so as to expose the top of the cup when the cap raises, the stationary tube 18 carries a pin 54 that engages a slot 56 formed in tubular member 20 and which slot 56 has an offset portion 58 in the lower end so that as the support arm and tubular member 20 approach their uppermost position they will be rotated to move the cap to a position off to one side of the cup. In FIGURE 4 the position of the cap when it is down is shown in full lines and the position of the cap when it is elevated is shown in dotted lines.

Since they may be some condensation within the cap, base 10 is preferably formed with a basin portion 60 to one side of the cup receiving recess to catch drippings from the cap.

A feature of this invention resides in a safety control that is represented by a pair of electrodes 62 and 64 carried on tubular support member 24 in the region of the upper level to which the cup will be filled with water. While these electrodes are submerged in the water they will permit current to flow in the energizing circuit for the heating element but when the water lowers to the point that the current flow between the electrodes is interrupted or reduced to a predetermined amount the flow of current to the electric heating element will stop.

The control circuit for the above described modification is illustrated in FIGURE 9. The service lines or power lines are indicated by L1 and L2. Connected therebetween is the resistance heating element 26 in series with a normally open relay blade 66 of a relay having a coil 68 which, when energized will cause the blade to close. The coil 68 of the relay is connected with line L1 on one side and on its other side connected with one of the electrodes 62, 64, the other electrode being connected with one of the contact members 36, the other thereof being connected with line L2.

It will be apparent that when a cup 16, having a conductive ring as described on the bottom, is pressed downwardly against contacts 36, and there is water in the cup to the required level, the current will flow through the coil 68 of the relay causing its blade 66 to close thus bringing about energization of the heating element 26. Dropping of the water level a predetermined amount will bring about interruption of the supply of energy to the heating element as will likewise removing of the cup from its position where it bridges contact elements 36.

Blade 66 of the relay is also arranged so that when the relay is de-energized and the blade is open, the solenoid 52 is energized to withdraw latch 50. In this manner the device is made so that it will automatically open when the heating element is de-energized. In any case, however, there is no chance that energization of the heating element will continue after the water level has dropped a predetermined amount.

It will also be noted that the cap 28 substantially completely encloses the heating element so that there is very little chance that it will be touched accidentally while it is hot.

The conductive ring 44 on the bottom of the cup may be formed by a number of methods, for example, by printing a ring of graphite on the bottom of the cup as indicated in FIGURE 6. Also, the ring could be provided by cementing a preformed conductive ring on the bottom of the cup. This conductive material need not necessarily be ring shaped so long as it provides a path between the electrodes but is conveniently annular in configuration because that eliminates the necessity for orienting the cup in any particular manner within the device.

The relay consisting of coil 68 and blade 66 can advantageously be mounted in the chamber 12 formed in the base of the device.

It may be that it will be desirable to use the device of the present invention with a standard paper or plastic cup having no conductive portion on the bottom thereof and this could be accomplished by the modification of FIGURE 14 wherein there is a control switch 70 mounted in the base having an actuating member 72 adapted for engagement by block 74 that is pushed downwardly by cup 76 when the latter is placed in operative position. The remainder of the circuit for the FIGURE 14 modification could be the same as shown in FIGURE 9 with switch 70 merely having its terminals connected to the same points of connection as the contact prongs 36 in FIGURE 9.

Should it be desired to interrupt both sides of the supply line, the modification of FIGURES 10 through 13 could be employed. This arrangement is the same as the one described except as will be seen in FIGURE 10 there are four contact prongs 80 in the base and the cup 82 is provided with two conductive rings 84. These rings may be printed on the bottom of the cup or may be on a disc 86 adapted for being cemented to the bottom of the cup.

The circuit is illustrated in FIGURE 12 wherein it will be seen that there is a pair of contact prongs 80 in each line leading from the power lines L1 and L2 so that when the cup is removed both lines are broken and the entire apparatus is de-energized.

The circuit also differs in that the relay that is controlled by the contact prongs and the electrodes that are in the water has two blades 88 which are connected between opposite ends of the heating element 90 at power lines L1 and L2. This is necessary because the conductive rings themselves cannot carry the current necessary to energize the heating element. The circuit of FIGURE 12 could include an unlatching relay if desired.

In the previously described modifications the water has been heated directly within the cup or container and conductive rings or areas on the bottom of the cup have been employed for activating the heater energizing circuit. However, it is possible to utilize the principles of this invention while heating larger quantities of water than a single cup by utilizing a container separate from the cup. Still further, the conductive region of the container or cup would not necessarily be located on the bottom but could be on the side as, for example, a trademark or other legend or the entire outer surface of the cup or container could be conductive as, for example, by being covered with foil or by there being a metallic film plated over the outer surface of the cup.

In FIGURES 15 through 18 there is illustrated one form which the device might take in which more than a single cup of water could be heated.

In the arrangement of FIGURES 15 through 18 there is shown a device comprising a base 100 having a recess 102 for receiving cup or container 104. Upstanding from the base is a support 106 on which is slidably mounted container 108. A movable latch 110 on the container will support the container in the upper position in which it is illustrated in FIGURE 15, or permit it to slide downwardly on the support to a lower position.

The support 106 is in the form of an inverted U and one leg thereof carries an electric heating element 112 and the liquid level sensitive electrode means 114. This arrangement corresponds to the arrangement of the heating element and electrode described in connection with the previous modification.

In the base is a vertically reciprocable carrier 116 having contact elements 118 engageable with stationary contact elements 120 and which elements 120 are interconnected by conductive means on the side of the container when it is placed in the base. When the container or cup is set in the base and it is desired to put the device in operation, a plate 121 is moved downwardly against the top of the cup and then is rotated so that the edge thereof is engaged by a latch or hook 122, best seen in FIGURE 18. Simultaneously with movement downwardly of plate 121 and rotation thereof to its latched position, the carrier 116 moves downwardly and this brings the contact elements 118 into engagement with members 120 thus establishing the energizing circuit for the heating element the same as has been described previously.

The device with the contact elements so engaged is illustrated in FIGURE 17. There is no automatic cutoff for the arrangement of FIGURES 15 through 18 although such could be provided if desired by a thermostatic element associated with container 108. One of the principal advantages of the arrangement is that a larger quantity of water can be heated while the heating element is at all times protected by being energizable only when it is completely submerged in the water. Should the water level show below the sensing electrode 114, the energizing current for the electric heater would be interrupted. It is understood that the circuit for the arrangement of FIGURES 15 through 18 is the same as that for the previously described modifications.

The FIGURES 15 through 18 construction embodies certain safety features. For example, the filling of the container is by way of the opening 124 in the upper end thereof and which also serves as a vent, but which opening is inaccessible when the container is elevated. To gain access to opening 124 latch 110 is moved and the container is lowered on the support. At this time an insulating block 126 on the container covers the contact members 120 so that the energizing circuit for the heating element cannot be established.

Since the container is large enough to contain several cups of water, it is provided with a simple valve 127 at the lower end which can be opened to deliver hot water to the cup.

It will be appreciated from the foregoing that the conductive portion of the cup could be on either the bottom or the side thereof and with this in mind there is shown in FIGURE 19 a cup having an inner paper part 130 and an outer foil part 132 so that the entire outer surface of the cup is conductive. The foil covering also assists in keeping the cup cool so that it can readily be handled.

FIGURE 20 shows a cup which may be made of plastic so that the body 134 is non-conductive but with there being a conductive area 136 on the side which may be in the form of a band or bands and which may be a trademark or trade name or the like printed or otherwise attached to the cup.

FIGURE 21 shows a plastic cup 138 having a film 140 of metal thereon which may be plated thereon by conventional practices such as by gas plating or by deposition of the metal from a vapor as in a conventional vacuum plating process.

From the foregoing it will be seen that the present invention provides for an arrangement for heating water with an electric heater in which the energizing circuit for the electric heater contains two switch means, one under the control of a cup and the other under the control of the liquid being heated so that the heater must be completely submerged in the liquid before the energizing circuit for the heater can be completed. The switch means are in the form of electrodes which may be closed by movement of the cup in the case where the electrode means form the contacts of a limit switch or they may be bridged by conductive means on the surface of the cup, or the electrode means may be bridged by water as in the case of the electrodes associated with the electric heater.

It will be understood that this invention is susceptible to modification in order to adapt it to different usages and conditions; and, accordingly, it is desired to comprehend such modifications within this invention as may fall within the scope of the appended claims.

I claim:

1. In combination; a cup, a base, an electric heater movably carried by the base, an energizing circuit for the heater, and at least two pairs of electrodes in the circuit through which electric current must flow to complete said circuit, conductive means on the cup adapted for connecting one pair of the electrodes by placing the cup in a predetermined position on the said base wherein said conductive means engages said one pair of electrodes, and the other pair of electrodes being located in the region of the upper end of the heater and sensitive to the level of the water in which the heater is submerged whereby the circuit to the heater can be completed only when the heater is submerged in water and the cup is in a predetermined position, said heater being movable on the base for being inserted in the cup so water in the cup will complete the circuit between the electrodes of said other pair of electrodes.

2. In a heating device; a base adapted for receiving a container such as a cup, said base including a resilient platform for receiving said cup, an electric heater for heating liquid in the container, a support for the heater movably connected with the base so the heater can be inserted in the container, an element on the support adapted to engage the container when the heater is inserted in the container operable to move the container and platform downwardly, an energizing circuit for the heater and means operated by downward movement of said container and platform for closing said energizing circuit, there being means responsive to the lowering of the liquid level in the container to a predetermined level to interrupt said energizing circuit.

3. In a heating device; a base adapted to receive a container such as a cup, an electric heater for heating liquid in the container, a support for the heater movable relative to the base so the heater can be inserted in the container, an element on the support operable to engage the bottom of the container on the inside when the support is moved to insert the heater in the container, said base including a resilient platform on which the container rests so the container will move downwardly when engaged by said element, an energizing circuit for the heater, and means including switch means operated by downward movement of the said platform when said container is engaged by said element for closing said energizing circuit, said means also including electrode means carried by the support in the region of the upper part of the container operable when submerged in the container to permit closing of said energizing circuit and also operable when the liquid level in the container is below the predetermined level to prevent closing of said energizing circuit.

4. In a heating device; a base adapted to receive a container such as a cup, an electric heater for heating liquid in the container, a support for the heater movably connected with the base so the heater can be inserted in the container, an element on the support operable to engage the bottom of the container on the inside when the support is moved to insert the heater in the container, said base including a resilient platform on which the container rests so the container will move downwardly when engaged by said element, an energizing circuit for the heater, and means including switch means operated by downward movement of the said platform when said container is engaged by said element for closing said energizing circuit, said switch means comprising contact elements carried by said base and conductive means on the container adapted for bridging said contact elements.

5. In a heating device; a base adapted to receive a container such as a cup, an electric heater for heating liquid in the container, a support for the heater movably connected with the base so the heater can be inserted in the container, an element on the support operable to engage the bottom of the container on the inside when the support is moved to insert the heater in the container, said base including a resilient platform on which the container rests so the container will move downwardly when engaged by said element, an energizing circuit for the heater, and means including switch means operated by downward movement of the said platform when said container is engaged by said element for closing said energizing circuit, said switch means comprising contact elements carried by said base and extending into said platform and conductive means on the bottom of the container adapted for bridging said contact element when the platform and container move downwardly, said conductive means comprising annular ring means of conductive material printed on the bottom of the container.

6. In a heating device; a base adapted to receive a container such as a cup, an electric heater for heating liquid in the container, a support for the heater movably connected with the base so the heater can be inserted in the container, an element on the support operable to engage the bottom of the container on the inside when the support is moved to insert the heater in the container, said base including a resilient platform on which the container rests so the container will move downwardly when engaged by said element, an energizing circuit for the heater, and means including switch means operated by downward movement of the said platform when said container is engaged by said element for closing said energizing circuit, said switch means comprising contact elements carried by said base and extending into said platform and conductive means on the bottom of the container adapted for bridging said contact element when the platform and container move downwardly, said conductive means comprising a thin member of non-conductive material on the bottom of the container and annular conductive ring means on the underside of said thin member.

7. In a heating device; a base to receive a container such as a paper cup, an electric heater for insertion into the cup to heat the contents thereof, a support for the heater movably connected with the base so the heater can be inserted in the cup, an element on the support operable to engage the bottom of the cup on the inside when the support is moved on the base to insert the heater into the cup, a resilient platform in the base on which the cup is mounted so the cup and platform will move downwardly when the cup is engaged by said element, an energizing circuit for the heater, means operated by downward movement of the cup and platform for closing said energizing circuit, said support being spring urged upwardly, a latch engageable with said support for holding it in its lowermost position, means for interrupting said energizing circuit, and means operable simultaneously with the interruption of said energizing circuit for withdrawing said latch to permit retraction of said support and heater.

8. In a heating device; a base having a recess therein to receive a paper cup or the like; a resilient platform in the bottom of the recess on which the cup is received, a vertically slidable support member on the base to one side of the cup, an electric heater supported on the support member so that lowering of the support member on the base will cause the heater to be inserted in the cup, an element on the bottom of the support member to engage the bottom of the cup to press it and the platform downwardly, an energizing circuit for said heater, a relay in circuit with said heater, first switch means in the base in circuit with the coil of said relay and operated by downward movement of the platform, and second switch means on the support toward the upper end of the cup operated by liquid in the cup in circuit with the coil of said relay whereby the relay can be closed only when the cup presses the platform downwardly and contains liquid to a predetermined level.

9. In a heating device; a base having a recess therein to receive a paper cup or the like; a resilient platform in the bottom of the recess on which the cup is received, a vertically slidable support member on the base to one side of the cup, an electric heater supported on the support member so that lowering of the support member on the base will cause the heater to be inserted in the cup, an element on the bottom of the support member to engage the bottom of the cup to press it and the platform downwardly, an energizing circuit for said heater, a relay in circuit with said heater, first switch means in the base in circuit with the coil of said relay and operated by downward movement of the platform, and second switch means on the support toward the upper end of the cup operated by liquid in the cup in circuit with the coil of said relay whereby the relay can be closed only when the cup presses the platform downwardly and contains liquid to a predetermined level, said support including a cap dependent about said heater adapted for closing the recess when the heating element is in the cup.

10. In a heating device; a base having a recess therein to receive a paper cup or the like; a resilient platform in the bottom of the recess on which the cup is received, a vertically slidable support member on the base to one side of the cup, an electric heater supported on the support member so that lowering of the support member on the base will cause the heater to be inserted in the cup, an element on the bottom of the support member to engage the bottom of the cup to press it and the platform downwardly, an energizing circuit for said heater, a relay in circuit with said heater, first switch means in the base in circuit with the coil of said relay and operated by downward movement of the platform, and second switch means on the support toward the upper end of the cup operated by liquid in the cup in circuit with the coil of said relay whereby the relay can be closed only when the cup presses the platform downwardly and contains liquid to a predetermined level, said support including a cap dependent about said heater adapted for closing the recess when the heating element is in the cup, there being spring means urging said support upwardly on the base, latch means operable for latching the support in its lower position on the base, and means operable for withdrawing said latch means in response to de-energization of said heater.

11. In a heating device; a base having a recess to receive a paper cup or the like, a vertically extending support member guided on said base for vertical movement to one side of said cup, said support member comprising an arm extending laterally therefrom, support means extending downwardly from the end of the arm opposite the support member, an electric heater carried on said support means, an element on the lower end of the support means operable to engage the bottom of the cup when the support member is moved downwardly, a resilient platform in the bottom of the recess engaged by the cup so that the platform moves downwardly when said element engages the cup, a cap on said support means operable to close the recess when the support member is moved downwardly, means for energizing the heater when the support means is moved downwardly, spring means urging the support member upwardly, a latch operable to latch the support member in its lower position, means for de-energizing the heater while simultaneously withdrawing said latch means, and cooperating elements of a cam means on said base and said support member operable for rotating the supporting member as it moves vertically on the base to rotate the said cap and heater laterally from over the cup.

12. In a heating arrangement; a support base, an electric heater carried by the base, a relay energizable for closing the energizing circuit to the heater, fixedly spaced contact elements in the base and fixedly spaced electrodes in series with each other and with the energizing coil of the relay, and a cup for containing liquid that is heated by the electric heater, said cup comprising conductive means on the outside adapted for bridging said contact elements when said cup is placed on the base in a predetermined position, said electrodes being supported with the heater so as to be in the region of the upper portion thereof whereby the relay coil can be energized only when the cup is in said predetermined position on said base and is therefore engaging the contact elements, and the heater is submerged in liquid in the cup at least up to the level of the electrodes, said heater being movable on the base to permit insertion of the heater into the cup after the cup has been placed in said predetermined position on the base.

13. In combination; a cup or a like container, and a device for receiving the cup for heating liquid therein, said device comprising a base portion, said base portion comprising downwardly yieldable means for supportingly receiving said cup, an electrically operated heating means receivable in said cup and energizable for heating liquid therein, a support member supporting the heating means and movably connected with said base so that the heating means can be moved by the support member and be inserted thereby in said cup, an element carried by the support member adapted to engage the cup when the heating means is inserted therein and operable to move the container and the yieldable means downwardly, an energizing circuit for the heating means and means operated by downward movement of said yieldable means for closing said energizing circuit, and a cap element carried by said support member and enclosing at least the upper portion of said cup when the heating means is inserted in the cup.

14. In combination; a cup or a like container, and a device for receiving the cup for heating liquid therein, said device comprising a base portion, said base portion comprising downwardly yieldable means for supportingly receiving said cup, an electrically operated heating means receivable in said cup and energizable for heating liquid therein, a support member supporting the heating means and movably connected with said base so that the heating means can be moved by the support member and be inserted thereby in said cup, an element carried by the support member adapted to engage the cup when the heating means is inserted therein and operable to move the container and the yieldable means downwardly, an energizing circuit for the heating means and means operated by downward movement of said yieldable means for closing said energizing circuit, and a cap element carried by said support member and enclosing at least the upper portion of said cup when the heating means is inserted in the cup, said base having an upwardly extending portion adapted for telescopically receiving said cap element when the heating means is inserted into the cup.

15. In combination; a cup or a like container, and a device for receiving the cup for heating water therein, said device comprising a base member having a support element for supportingly receiving said cup, an electrically operated heating means receivable in said cup and energizable for heating liquid therein, a support member supporting said heating means and connected with said base member for movement in a vertical direction thereon so that the heating means can be moved by the support member and be inserted thereby in said cup, a clamp element carried by the support member arranged thereon to engage the cup from above when the support member is moved on the base member to insert the heating means in the cup, at least one of said support element and clamp element being yieldably supported on its pertaining member, an energizing circuit for said heating means, means operated by downward movement of the support member on the base when a cup is resting on said support element and is engaged by said clamp element for closing said energizing circuit, and an inverted cap element carried by said support member dependent about the said heating means and enclosing at least the upper portion of said cup when the support member is moved into position to insert the heating means into said cup.

16. The combinaton according to claim 15 wherein said energizing circuit includes electrode means which are immersed in the water in the cup in spaced relation in response to movement of the support member to insert said heating means into the cup whereby the water in the cup forms a conductive path between said electrode means, said electrode means being connected in said energizing circuit so as to permit closing of said energizing circuit only when there is a conductive path between said electrode means, at least one of said electrode means being located in the region of the upper level of the water in the cup when immersed therein whereby lowering of the water level in the cup a predetermined amount will interrupt the conductive path between said electrode means.

17. In a heating device; a base member, a support element supported on the base member adapted for receiving a container, such as a cup, an electric heater for heating liquid in the containers, a support member supporting the heater and movably connected to the base so the heater can be inserted in the container by downward movement of the support member, a clamp element supported on the support member adapted to engage the container from above when the heater is inserted in the container, at least one of said elements being resiliently supported on its pertaining member, an energizing circuit for the heater, means operated by downward movement of the support member when there is a container on the support element engaged between the clamp element and the support element for closing said energizing circuit, and means carried at least in part by said support member and extending into the upper end of the container when the support member is moved to insert the heater into the container operable in response to the lowering to the liquid level in the container to a predetermined point to interrupt said energizing circuit.

(References on following page)

References Cited in the file of this patent

UNITED STATES PATENTS

| | | |
|---|---|---|
| 1,251,411 | O'Connor | Dec. 25, 1917 |
| 1,433,388 | Ledig | Oct. 24, 1922 |
| 1,559,002 | Plastino | Oct. 27, 1925 |
| 1,588,776 | Shoenberg et al. | June 15, 1926 |
| 1,978,089 | Jones | Oct. 23, 1934 |
| 2,027,296 | Stuart et al. | Jan. 7, 1936 |
| 2,053,923 | Stewart | Sept. 8, 1936 |
| 2,240,953 | Kaye | May 6, 1941 |
| 2,424,583 | Rahm | July 29, 1947 |
| 2,448,634 | Smith | Sept. 7, 1948 |
| 2,528,191 | Turner | Oct. 31, 1950 |
| 2,606,995 | Trubert | Aug. 12, 1952 |
| 2,609,478 | Crawford et al. | Sept. 2, 1952 |
| 2,749,382 | Lockard | June 5, 1956 |
| 2,783,357 | Readey | Feb. 26, 1957 |
| 2,808,352 | Coleman et al. | Oct. 1, 1957 |
| 2,982,934 | Browne | May 2, 1961 |

FOREIGN PATENTS

| | | |
|---|---|---|
| 606,606 | Germany | Dec. 6, 1934 |
| 133,662 | Australia | July 28, 1949 |
| 629,057 | Great Britain | Sept. 9, 1949 |
| 957,965 | Germany | Feb. 14, 1957 |